(12) United States Patent
Park

(10) Patent No.: US 11,594,794 B2
(45) Date of Patent: Feb. 28, 2023

(54) BATTERY

(71) Applicant: Samsung SDI Co., Ltd., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 62 days.

(21) Appl. No.: 17/109,517

(22) Filed: Dec. 2, 2020

(65) Prior Publication Data

US 2021/0184322 A1    Jun. 17, 2021

(30) Foreign Application Priority Data

Dec. 11, 2019  (KR) .................. 10-2019-0164644

(51) Int. Cl.
*H01M 50/593* (2021.01)
*H01M 10/04* (2006.01)

(52) U.S. Cl.
CPC ..... *H01M 50/593* (2021.01); *H01M 10/0427* (2013.01); *H01M 10/0477* (2013.01)

(58) Field of Classification Search
CPC ........... H01M 50/593; H01M 10/0427; H01M 10/0477
See application file for complete search history.

(56) References Cited

U.S. PATENT DOCUMENTS

| | | | |
|---|---|---|---|
| 3,891,462 A | 6/1975 | Langkau | |
| 6,087,037 A | 7/2000 | Rieder | |
| 6,325,552 B1 * | 12/2001 | Brillhart | H05K 7/1061 385/88 |
| 6,451,477 B1 | 9/2002 | Lake | |
| 9,780,343 B2 | 10/2017 | Sawayama et al. | |
| 10,916,745 B2 | 2/2021 | Kim | |
| 2006/0127758 A1 | 6/2006 | Shishido et al. | |
| 2007/0122704 A1 * | 5/2007 | Daniel-Lvad | H01M 10/286 252/182.1 |

(Continued)

FOREIGN PATENT DOCUMENTS

| | | |
|---|---|---|
| CN | 104795519 A | 7/2015 |
| CN | 106450124 A | 2/2017 |
| JP | 658796 B2 | 8/1994 |

(Continued)

OTHER PUBLICATIONS

Extended European Search Report from corresponding European Application No. 20213044.9, Extended European Search Report dated Jun. 23, 2021 (6 pgs.).

(Continued)

*Primary Examiner* — Brian R Ohara
*Assistant Examiner* — Emily Elizabeth Freeman
(74) *Attorney, Agent, or Firm* — Lewis Roca Rothgerber Christie LLP

(57) ABSTRACT

A battery includes: a core cell including a first surface and a second surface which are opposite each other and on which first and second electrodes are respectively located, and a lateral surface connecting the first and second surfaces; an insulating sheet arranged on the first surface of the core cell and in which a conduction hole facing the first electrode is defined; and an electrode plate arranged on the insulating sheet and electrically connected to the first electrode through the conduction hole.

20 Claims, 5 Drawing Sheets

(56) References Cited

U.S. PATENT DOCUMENTS

2013/0196222 A1    8/2013  Brenner et al.
2015/0207112 A1*   7/2015  Sawayama .......... H01M 50/183
                                               429/174

FOREIGN PATENT DOCUMENTS

| JP | 4708521 B2 | 6/2011 |
| JP | 2016-170941 A | 9/2016 |
| KR | 10-0982468 B1 | 9/2010 |

OTHER PUBLICATIONS

CN Office action dated Aug. 29, 2022 cited in corresponding CN Application No. 202011460888.9, 8 pages, with English translation, 7 pages.

* cited by examiner

BATTERY

CROSS-REFERENCE TO RELATED APPLICATION

This application claims priority to and the benefit of Korean Patent Application No. 10-2019-0164644, filed on Dec. 11, 2019 in the Korean Intellectual Property Office, the entire disclosure of which is incorporated herein by reference.

BACKGROUND

1. Field

Aspects of one or more embodiments relate to a battery.

2. Description of the Related Art

In general, secondary batteries refer to batteries that can be repeatedly charged and recharged, unlike non-rechargeable primary batteries. Secondary batteries may be used as energy sources of devices such as mobile devices, electric vehicles, hybrid vehicles, electric bicycles, or uninterruptible power supplies. Secondary batteries may be individually used or secondary battery modules each including a plurality of secondary batteries connected as one unit may be used according to the types of external devices using the secondary batteries.

SUMMARY

According to an aspect of one or more embodiments, a battery is provided in which an output terminal having a relatively large size is provided for a relatively small electrode of a core cell, such that a circuit board may be easily electrically connected to the battery, the circuit board may have a freely designed conduction point, and a possibility of failure, such as conduction failure, may be reduced.

Additional aspects will be set forth, in part, in the description which follows and, in part, will be apparent from the description, or may be learned by practice of the presented embodiments of the disclosure.

According to one or more embodiments, a battery includes: a core cell including a first surface and a second surface which are opposite each other and on which first and second electrodes are respectively located, and a lateral surface connecting the first and second surfaces; an insulating sheet arranged on the first surface of the core cell and in which a conduction hole facing the first electrode is defined; and an electrode plate arranged on the insulating sheet and electrically connected to the first electrode through the conduction hole.

In an embodiment, the first and second surfaces of the core cell may have a circular shape, and the lateral surface of the core cell may include a rounded circumferential surface connecting the first and second surfaces.

In an embodiment, the core cell may have a cylindrical shape with a height less than a diameter of the first surface.

In an embodiment, an aspect ratio of the height of the core cell to the diameter of the first surface may be in a range from about 5.4:12 to about 5.4:14.

In an embodiment, the first electrode of the core cell may be located at a center position of the first surface, and the second electrode of the core cell may extend from the entirety of the second surface via the lateral surface to a peripheral position of the first surface surrounding the center position of the first surface.

In an embodiment, the first and second electrodes may be spaced apart from each other on the first surface with an insulating gap therebetween to electrically insulate therebetween.

In an embodiment, the electrode plate may be configured as a first output terminal of the battery which is connected to the first electrode to externally provide a potential of the first electrode, and the second electrode may be configured as a second output terminal of the battery.

In an embodiment, the conduction hole may expose at least a portion of the first electrode from the insulating sheet.

In an embodiment, a conductive connection member may be arranged in the conduction hole to electrically connect between the first electrode and the electrode plate which are provided on upper and lower sides of the insulating sheet.

In an embodiment, the conductive connection member may include a compressible conductor which is compressible so as to be compressed in mutually-facing directions between the electrode plate and the first electrode for contact with the electrode plate and the first electrode.

In an embodiment, the conductive connection member may include an anisotropic conductive film (ACF).

In an embodiment, a thickness of conductive connection member may be greater than a thickness of the insulating sheet surrounding the conduction hole before the conductive connection member is compressed, and may be equal to the thickness of the insulating sheet after the conductive connection member is compressed.

In an embodiment, the electrode plate may be in contact with both the conductive connection member, which is arranged in the conduction hole, and the insulating sheet which surrounds the conduction hole.

In an embodiment, the electrode plate may have a size greater than a size of the first electrode.

In an embodiment, the electrode plate may have a radius which is greater than a radius of the first electrode defined at a center position of the first surface and is less than a radius of the first surface.

In an embodiment, the insulating sheet may have a ring shape surrounding the conduction hole defined at a center position of the insulating sheet, and the insulating sheet may be arranged between the second electrode located at a peripheral position of the first surface and the electrode plate connected to the first electrode through the conduction hole.

In an embodiment, the insulating sheet may be defined by an inner circumference and an outer circumference which form concentric circles, and the inner circumference corresponds to a boundary with the conduction hole.

In an embodiment, an extension end of the second electrode which extends from the second surface to a peripheral position of the first surface via the lateral surface may be located on the inner circumference of the insulating sheet or between the inner circumference and the outer circumference of the insulating sheet.

In an embodiment, a radius of the outer circumference of the insulating sheet may be greater than a radius of the electrode plate and less than a radius of the first surface.

In an embodiment, the conduction hole, the inner and outer circumferences of the insulating sheet, the electrode plate, and the first surface may have concentric circle shapes.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
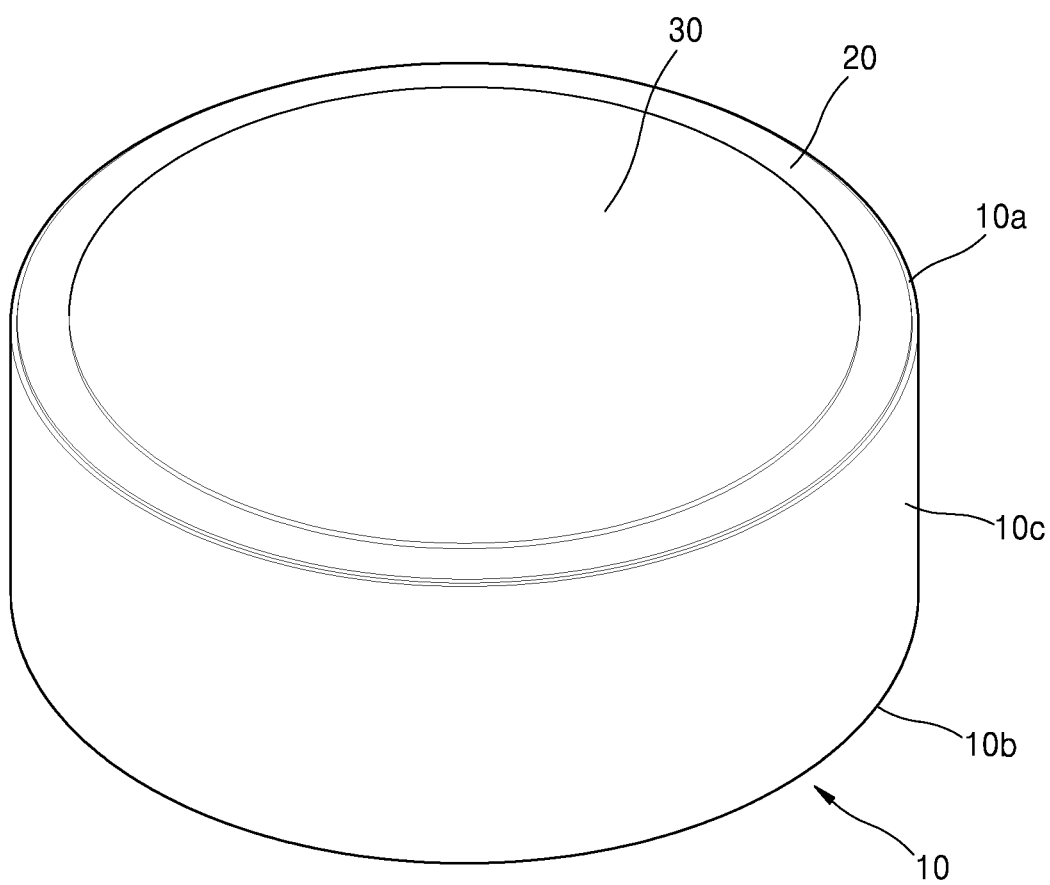
FIG. 1 is a perspective view illustrating a battery according to an embodiment.

Reference will now be made in further detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

It is to be understood that, although the terms "first," "second," etc. may be used herein to describe various components, these components should not be limited by these terms. These terms are used to distinguish one component from another.

As used herein, the singular forms "a," "an," and "the" are intended to include the plural forms as well, unless the context clearly indicates otherwise.

It is to be understood that the terms "comprise," "include," and "have" used herein specify the presence of stated features or components, but do not preclude the presence or addition of one or more other features or components.

Sizes of components in the drawings may be exaggerated for convenience of description. In other words, since the sizes and thicknesses of components in the drawings may be arbitrarily illustrated for convenience of description, the following embodiments are not limited thereto.

It is to be understood that when a layer, region, or component is referred to as being "connected to" another layer, region, or component, it may be directly connected to the other layer, region, or component or may be indirectly connected to the other layer, region, or component with one or more intervening layers, regions, or components interposed therebetween. For example, it is to be understood that when a layer, region, or component is referred to as being "electrically connected to" another layer, region, or component, it may be directly electrically connected to the other layer, region, or component or may be indirectly electrically connected to the other layer, region, or component with one or more intervening layers, regions, or components interposed therebetween.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

Herein, batteries will be described according to some example embodiments with reference to the accompanying drawings.

Figure 2:
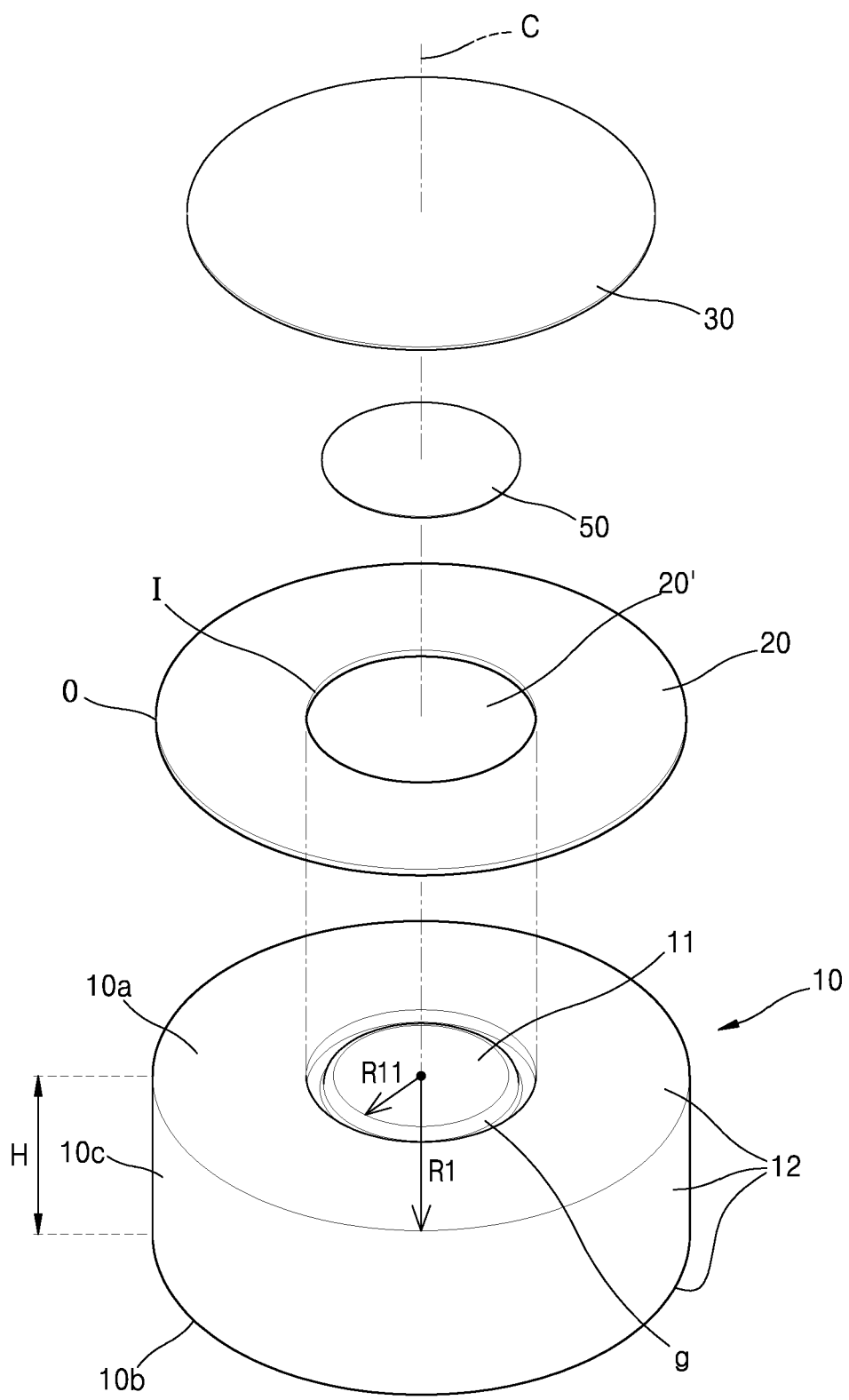
FIG. 2 is an exploded perspective view illustrating the battery shown in FIG. 1.
Figure 3:
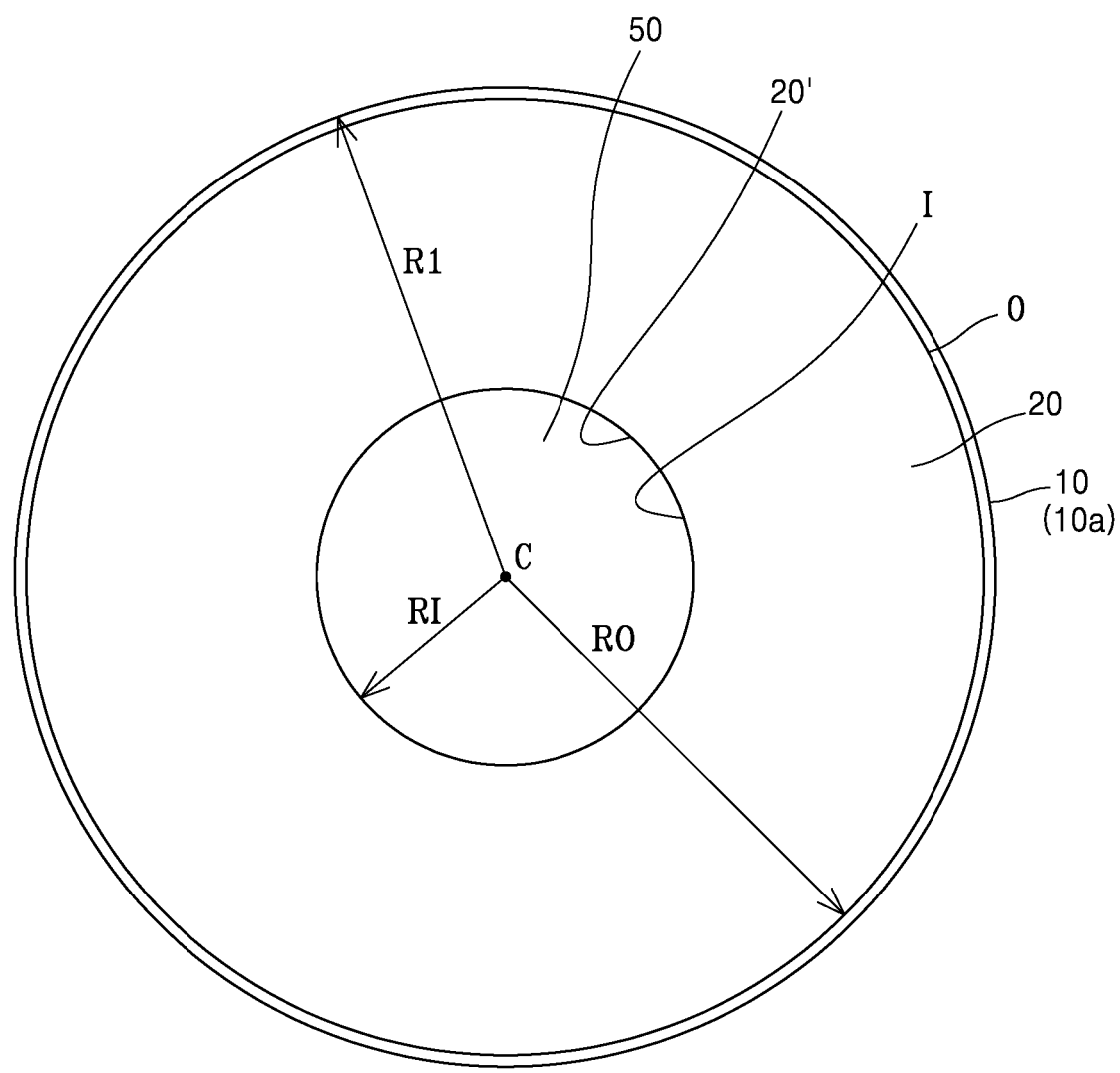
FIG. 3 is a plan view illustrating an insulating sheet shown in FIG. 2.
Figure 4:
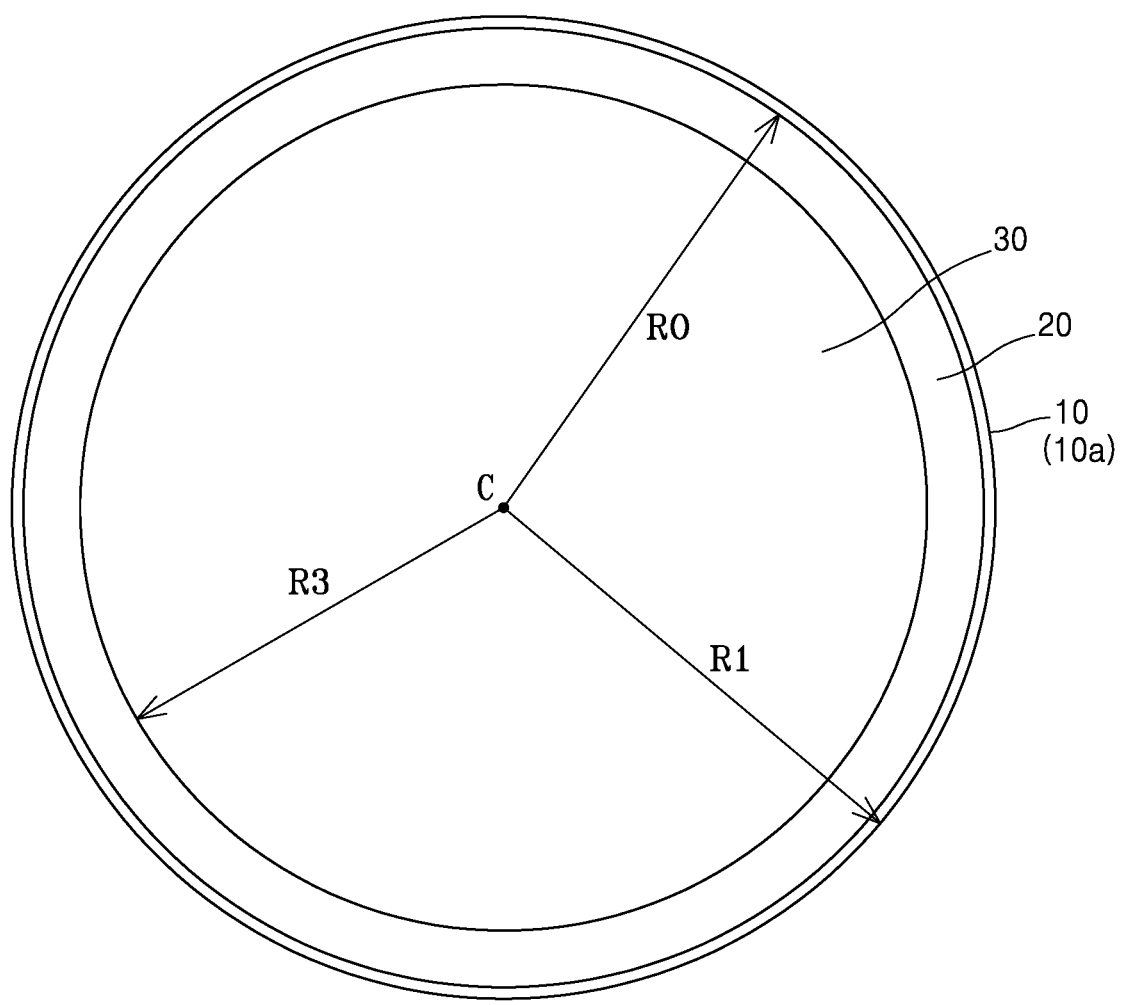
FIG. 4 is a plan view illustrating an electrode plate shown in FIG. 2.
Figure 5A:
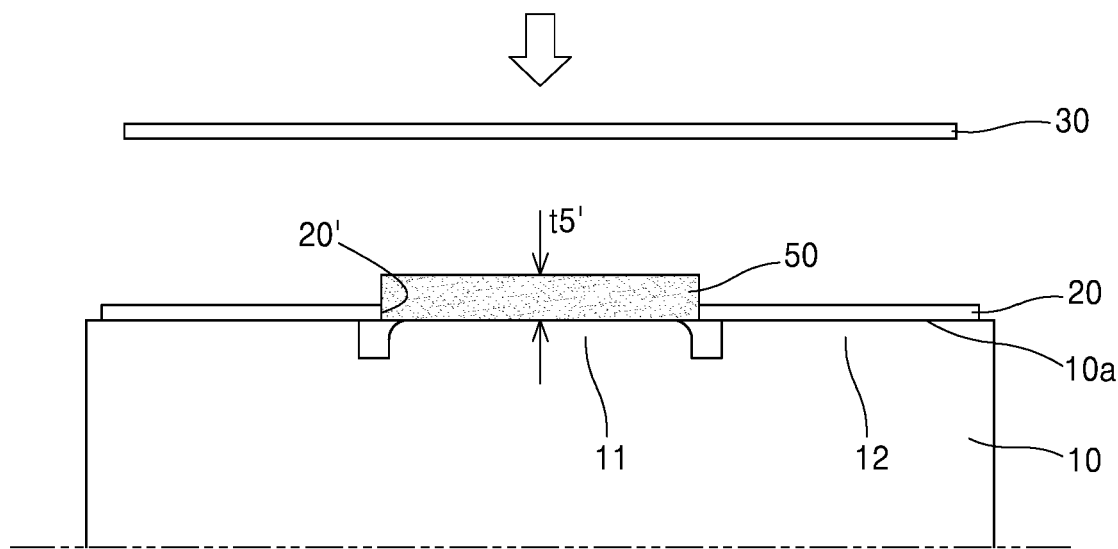
FIGS. 5A and 5B are views respectively illustrating a pre-compression state and a post-compression state of a conductive connection member.
Figure 5B:
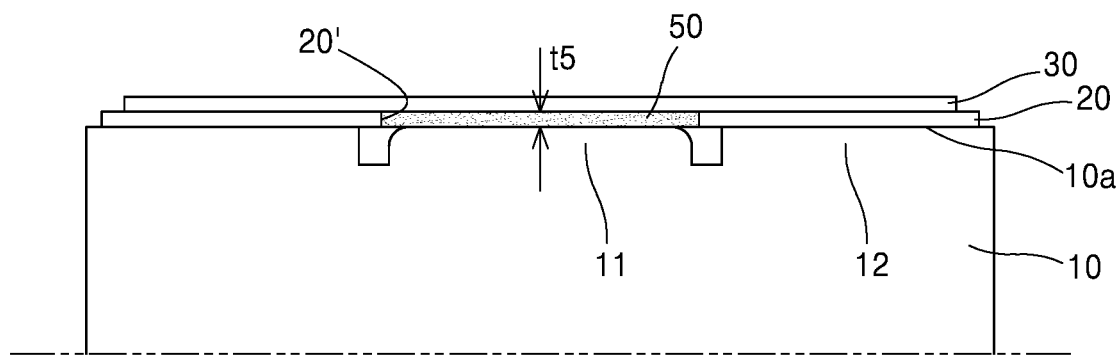

FIG. 1 is a perspective view illustrating a battery according to an embodiment; FIG. 2 is an exploded perspective view illustrating the battery shown in FIG. 1; FIG. 3 is a plan view illustrating an insulating sheet 20 shown in FIG. 2; FIG. 4 is a plan view illustrating an electrode plate 30 shown in FIG. 2; and FIGS. 5A and 5B are views respectively illustrating a pre-compression state and a post-compression state of a conductive connection member 50.

Referring to FIGS. 1 and 2, a battery may include: a core cell 10 that includes first and second surfaces 10a and 10b which are opposite each other and on which first and second electrodes 11 and 12 are respectively formed, and a lateral surface 10c which connects the first and second surfaces 10a and 10b to each other; the insulating sheet 20 that is arranged on the first surface 10a of the core cell 10 and includes a conduction hole 20' facing the first electrode 11; and the electrode plate 30 that is arranged on the insulating sheet 20 and is electrically connected to the first electrode 11 through the conduction hole 20'.

The core cell 10 may include: the first and second surfaces 10a and 10b which are opposite each other; and the lateral surface 10c which connects the first and second surfaces 10a and 10b to each other. For example, according to an embodiment, the core cell 10 may include the first and second surfaces 10a and 10b that have a circular shape; and the lateral surface 10c that forms a rounded circumferential surface through which the first and second surfaces 10a and 10b are connected to each other. For example, according to an embodiment, the core cell 10 may be formed in a slim cylindrical shape such that the core cell 10 may have a small height H which is less than a diameter of the first surface 10a (the diameter is twice a radius R1 of the first surface 10a). For example, an aspect ratio, that is, a ratio of the height H and the diameter (twice the radius R1) of the core cell 10 may be in a range from about 5.4:12 to about 5.4:14.

The first and second electrodes 11 and 12 having opposite polarities may be formed on the first and second surfaces 10a and 10b of the core cell 10. In an embodiment, for example, the first electrode 11 may be formed at a center position of the first surface 10a, and the second electrode 12 may be formed entirely on the second surface 10b and the lateral surface 10c and may extend from the lateral surface 10c to a peripheral position around the center position of the first surface 10a. The first and second electrodes 11 and 12 may be formed together on the first surface 10a at different positions. For example, the first electrode 11 may be formed at the center position of the first surface 10a, and the second electrode 12 may be formed at the peripheral position of the first surface 10a. In this case, the first and second electrodes 11 and 12, which are formed on the first surface 10a, may be spaced apart from each other with an insulating gap (g) therebetween and may thus be electrically insulated from each other. Throughout the present specification, the expression that the first and second electrodes 11 and 12 are formed on the first and second surfaces 10a and 10b of the core cell 10 may mean that the first and second electrodes 11 and 12 are formed at center positions of the first and second surfaces 10a and 10b.

The insulating sheet 20 may be arranged on the first surface 10a of the core cell 10. The conduction hole 20' may be formed at a center position of the insulating sheet 20 such that at least a portion of the first electrode 11 formed on the first surface 10a may be exposed through the conduction hole 20'. In an embodiment, for example, the conduction hole 20' may have a circular shape, and the conduction hole 20' and the first surface 10a having a circular shape may be concentric with a same center axis C. In an embodiment, the insulating sheet 20 may include a polymer resin material, such as polyimide (PI).

The insulating sheet 20 may have a shape surrounding the conduction hole 20' and may be arranged between the second electrode 12, which is formed at the peripheral position of the first surface 10a, and the electrode plate 30, which is connected to the first electrode 11 through the conduction hole 20', such that the second electrode 12 and the first electrode 11 may be insulated from each other by the insulating sheet 20. In other words, the insulating sheet 20 may be arranged between the first surface 10a of the core cell 10 and the electrode plate 30 such that the second electrode 12 formed at the peripheral position of the first surface 10a may be insulated from the electrode plate 30 connected to the first electrode 11.

Referring to FIG. 3, the insulating sheet 20 may be defined between the first surface 10a having a circular shape and the conduction hole 20' having a circular shape by an inner circumference (I) (corresponding to a boundary of the conduction hole 20') and an outer circumference (0) which are shaped like concentric circles having the same center axis C, and the insulating sheet 20 may have a ring shape, or annular shape, between the inner circumference (I) and the outer circumference (0). Here, the inner circumference (I) of the insulating sheet 20 may correspond to the boundary of the conduction hole 20', and throughout the present specification, the inner circumference (I) and the conduction hole 20' of the insulating sheet 20 may form substantially the same circular profile.

In an embodiment, each of the first surface 10a having a circular shape, the conduction hole 20' having a circular shape, and the inner circumference (I) (corresponding to the boundary of the conduction hole 20') and the outer circumference (0) of the insulating sheet 20 may be concentric with the same center axis C. The inner circumference (I) of the insulating sheet 20 may correspond to the boundary between the insulating sheet 20 and the conduction hole 20', and, in an embodiment, the outer circumference (0) of the insulating sheet 20 may have a radius RO between a radius of the conduction hole 20' and the radius R1 of the first surface 10a. That is, the radius RO of the outer circumference (0) may be less than the radius R1 of the first surface 10a but greater than the radius of the conduction hole 20', or a radius RI of the inner circumference (I). In an embodiment, since the radius RO of the outer circumference (0) forming the outer boundary of the insulating sheet 20 is less than the radius R1 of the first surface 10a, the insulating sheet 20 may not protrude from the core cell 10 along the outer circumference of the core cell 10, and since the battery may have no portion protruding from the core cell 10, the battery may be effectively used in a small device.

As indicated by one-dot chain lines in FIG. 2, an extension end of the second electrode 12, which extends from the second surface 10b to the peripheral position of the first surface 10a via the lateral surface 10c of the core cell 10, may be located on the inner circumference (I) of the insulating sheet 20 or between the inner circumference (I) and the outer circumference (0) of the insulating sheet 20. If the extension end (refer to the one-dot chain lines in FIG. 2) of the second electrode 12 provided on the first surface 10a were located inside the inner circumference I of the insulating sheet 20, both the first electrode 11 and the second electrode 12 would be exposed through the conduction hole 20' and may thus be electrically connected to the electrode plate 30 through the conduction hole 20' to cause a short circuit.

Referring to FIGS. 2 and 4, the electrode plate 30 may be arranged on the insulating sheet 20 and may be electrically connected to the first electrode 11 through the conduction hole 20' of the insulating sheet 20. Since the electrode plate 30 is connected to the first electrode 11 through the conduction hole 20', the electrode plate 30 may have a same potential as the first electrode 11 of the core cell 10 and may function as a first output terminal providing the potential of the first electrode 11 to the outside. In an embodiment, the potential of the first electrode 11 of the core cell 10 may be provided to the outside through the electrode plate 30 functioning as a first output terminal, and the second electrode 12 of the core cell 10 may function as a second output terminal by itself. For example, the first output terminal (the electrode plate 30) of the battery may be formed on an upper surface of the battery which corresponds to the first surface 10a of the core cell 10, and the second output terminal of the battery may be formed on a lower surface of the battery which corresponds to the second surface 10b of the core cell 10.

In an embodiment, the electrode plate 30 may have a size greater than a size of the first electrode 11 formed on the first surface 10a of the core cell 10. In an embodiment, for example, the electrode plate 30 and the first electrode 11 may have a circular shape corresponding to the first surface 10a of the core cell 10, and a radius R3 (refer to FIG. 4) of the electrode plate 30 may be greater than a radius R11 (refer to FIG. 2) of the first electrode 11. In an embodiment, the electrode plate 30 has a size greater than the first electrode 11 which is relatively small and formed at the center position of the first surface 10a of the core cell 10, and the first output terminal (the electrode plate 30) having an enlarged size may be provided to the outside of the battery. For example, the first output terminal provided by the electrode plate 30 and the second output terminal provided by the second electrode 12 of the core cell 10 may have sizes corresponding to the upper and lower surfaces of the battery, for example, equal to or at least similar to the sizes of the upper and lower surfaces of the battery, and, thus, electrical connection between the battery and a circuit board (not shown) may be easily made. For example, a contact point of a contact spring of the circuit board (not shown) may be freely designed, and the possibility of failure, such as conduction failure, may be reduced.

Referring to FIG. 4, in an embodiment, the radius R3 of the electrode plate 30 may be less than the radius R1 of the first surface 10a of the core cell 10. Therefore, the electrode plate 30 may not protrude from the core cell 10 along the outer circumference of the core cell 10, and since the electrode plate 30 does not form a portion protruding from the core cell 10, the battery may be effectively used in a small device.

In an embodiment, the electrode plate 30 and the insulating sheet 20 may have a circular shape corresponding to the first surface 10a of the core cell 10, and the radius R3 of the electrode plate 30 may be less than the radius RO of the outer circumference (0) of the insulating sheet 20. Therefore, it may be possible to prevent or substantially prevent a case in which a portion of the electrode plate 30 is exposed from the insulating sheet 20 and forms a short circuit with the second electrode 12 formed at the peripheral position of the first surface 10a of the core cell 10.

The electrode plate 30 may include a metal plate having high electrical conductivity, and, in an embodiment, the electrode plate 30 may include a nickel plate or a nickel alloy plate.

Referring to FIGS. 2, 5A, and 5B, the conduction hole 20' may be formed through the insulating sheet 20 such that the first surface 10a of the core cell 10 (or the first electrode 11 formed on the first surface 10a) and the electrode plate 30, which are provided at upper and lower sides of the insulating sheet 20, may be electrically connected to each other through the conduction hole 20'. For example, the conductive connection member 50 may be arranged in the conduction hole 20' as a medium for electrical connection between the first surface 10a of the core cell 10 (or the first electrode 11 formed on the first surface 10a) and the electrode plate 30. The conductive connection member 50 may be arranged in the conduction hole 20' between the electrode plate 30 and the first electrode 11, which are arranged on respective sides of the insulating sheet 20 in which the conduction hole 20' is formed, and may then be compressed as being pressed in mutually-facing directions, such that the electrode plate 30 and the first electrode 11 may be electrically connected to each other in a state in which the conductive connection member 50 is in tight contact with the electrode plate 30 and the first electrode 11 due to the resilience or elasticity of the compressed conductive connection member 50. In an embodiment, the conductive connection member 50 may include a compressible conductor. For example, the compressible conductor may include a contact-type elastic part such as a contact spring or an anisotropic conductive film (ACF). In an embodiment, the conductive connection member 50 may include an ACF.

Referring to FIGS. 5A and 5B, in an embodiment, the ACF (conductive connection member 50) arranged between the electrode plate 30 and the first electrode 11 may be compressed by pressing the electrode plate 30, which is arranged above the first surface 10a of the core cell 10, toward the first electrode 11 in a state in which the ACF (conductive connection member 50) is placed in the conduction hole 20' between the electrode plate 30 and the first electrode 11, and then conductive particles dispersed in an insulating base material of the ACF (conductive connection member 50) may be connected to each other such that the electrode plate 30 and the first electrode 11 may be electrically connected to each other through the ACF (conductive connection member 50). In this case, as being compressed between the electrode plate 30 and the first electrode 11, the thickness of the ACF (conductive connection member 50) may be reduced from a pre-compression thickness t5' which is relatively great to a post-compression thickness t5 corresponding to the thickness of the insulating sheet 20, and, as a result, the total thickness of the battery may be reduced such that the battery may be slim in the height direction thereof. In an embodiment, the ACF having a large thickness reduction when compressed is used as the conductive connection member 50, and, thus, the battery may be slimmer than in a case in which a contact-type elastic part such as a contact spring is used as the conductive connection member 50.

In other words, in an embodiment, the conductive connection member 50 arranged in the conduction hole 20' may have the pre-compression thickness t5' before being compressed, which is greater than the thickness of the insulating sheet 20 surrounding the conduction hole 20', and the post-compression thickness t5 after being compressed, which is equivalent to the thickness of the of the insulating sheet 20. For example, since the thickness of the conductive connection member 50 may be reduced to a thickness (post-compression thickness t5) equivalent to the thickness of the insulating sheet 20 after being compressed, the conductive connection member 50 may not form an additional height from the insulating sheet 20. In other words, the post-compression thickness t5 of the conductive connection member 50 may be equivalent to the thickness of the insulating sheet 20 such that the electrode plate 30 arranged on the insulating sheet 20 may not be spaced upward from the insulating sheet 20. That is, in an embodiment, the electrode plate 30 may be brought into contact with both the conductive connection member 50 arranged in the conduction hole 20' and the insulating sheet 20 surrounding the conduction hole 20'.

As described above, according to one or more embodiments, an output terminal having a relatively large size is provided for a relatively small electrode of the core cell 10, such that a circuit board may be easily electrically connected to the battery, the circuit board may have a freely designed conduction point, and a possibility of failure, such as conduction failure, may be reduced.

It is to be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as set forth in the following claims.

What is claimed is:

1. A battery comprising:
   a core cell comprising a first surface and a second surface which are opposite each other and on which first and second electrodes are respectively located, and a lateral surface connecting the first and second surfaces, the first surface being an outer surface of the core cell facing away from the second surface;
   an insulating sheet arranged on the first surface of the core cell and in which a conduction hole facing the first electrode is defined; and
   an electrode plate arranged on the insulating sheet such that the insulating sheet is between the electrode plate and the first surface of the core cell, the electrode plate electrically connected to the first electrode through the conduction hole.

2. The battery of claim 1, wherein
   the first and second surfaces of the core cell have a circular shape, and the lateral surface of the core cell comprises a rounded circumferential surface connecting the first and second surfaces.

3. The battery of claim 1, wherein the core cell has a cylindrical shape with a height less than a diameter of the first surface.

4. The battery of claim 3, wherein an aspect ratio of the height of the core cell to the diameter of the first surface is in a range from about 5.4:12 to about 5.4:14.

5. The battery of claim 1, wherein
the first electrode of the core cell is located at a center position of the first surface, and
the second electrode of the core cell extends from an entirety of the second surface via the lateral surface to a peripheral position of the first surface surrounding the center position of the first surface.

6. The battery of claim 5, wherein the first and second electrodes are spaced apart from each other on the first surface with an insulating gap therebetween to electrically insulate therebetween.

7. The battery of claim 1, wherein
the electrode plate is configured as a first output terminal of the battery which is connected to the first electrode and externally provides a potential of the first electrode, and
the second electrode is configured as a second output terminal of the battery.

8. The battery of claim 1, wherein the conduction hole exposes at least a portion of the first electrode from the insulating sheet.

9. The battery of claim 1, wherein a conductive connection member is arranged in the conduction hole to electrically connect between the first electrode and the electrode plate which are located on upper and lower sides of the insulating sheet.

10. The battery of claim 9, wherein the conductive connection member comprises a compressible conductor which is compressible so as to be compressed in mutually-facing directions between the electrode plate and the first electrode for contact with the electrode plate and the first electrode.

11. The battery of claim 9, wherein the conductive connection member comprises an anisotropic conductive film.

12. The battery of claim 9, wherein a thickness of the conductive connection member is greater than a thickness of the insulating sheet surrounding the conduction hole before the conductive connection member is compressed, and is equal to the thickness of the insulating sheet after the conductive connection member is compressed.

13. The battery of claim 12, wherein the electrode plate is in contact with both the conductive connection member, which is arranged in the conduction hole, and the insulating sheet which surrounds the conduction hole.

14. The battery of claim 1, wherein the electrode plate has a size greater than a size of the first electrode.

15. The battery of claim 14, wherein the electrode plate has a radius which is greater than a radius of the first electrode defined at a center position of the first surface and is less than a radius of the first surface.

16. The battery of claim 1, wherein
the insulating sheet has a ring shape surrounding the conduction hole defined at a center position of the insulating sheet, and
the insulating sheet is arranged between the second electrode located at a peripheral position of the first surface and the electrode plate connected to the first electrode through the conduction hole.

17. The battery of claim 1, wherein the insulating sheet is defined by an inner circumference and an outer circumference which define concentric circles, and the inner circumference corresponds to a boundary with the conduction hole.

18. The battery of claim 17, wherein an extension end of the second electrode which extends from the second surface to a peripheral position of the first surface via the lateral surface is located on the inner circumference of the insulating sheet or between the inner circumference and the outer circumference of the insulating sheet.

19. The battery of claim 17, wherein a radius of the outer circumference of the insulating sheet is greater than a radius of the electrode plate and less than a radius of the first surface.

20. The battery of claim 17, wherein the conduction hole, the inner and outer circumferences of the insulating sheet, the electrode plate, and the first surface have concentric circle shapes.

* * * * *